(12) United States Patent
Langton et al.

(10) Patent No.: US 10,467,260 B2
(45) Date of Patent: Nov. 5, 2019

(54) CLASSIFICATION OF SOFTWARE BASED ON USER INTERFACE ELEMENTS

(71) Applicant: Juniper Networks, Inc., Sunnyvale, CA (US)

(72) Inventors: Jacob Asher Langton, Oakland, CA (US); Daniel J. Quinlan, San Francisco, CA (US); Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 5 days.

(21) Appl. No.: 15/396,056

(22) Filed: Dec. 30, 2016

(65) Prior Publication Data

US 2017/0109432 A1   Apr. 20, 2017

Related U.S. Application Data

(63) Continuation of application No. 14/230,143, filed on Mar. 31, 2014, now Pat. No. 9,569,520.

(51) Int. Cl.
*G06F 17/30* (2006.01)
*G06F 16/28* (2019.01)
(Continued)

(52) U.S. Cl.
CPC .......... *G06F 16/287* (2019.01); *G06F 9/451* (2018.02); *G06F 16/184* (2019.01); *G06F 16/285* (2019.01); *G06F 16/35* (2019.01)

(58) Field of Classification Search
CPC .......... G06F 9/4443; G06F 17/30601; G06F 17/30705; G06F 16/287; G06F 16/35; G06F 16/184; G06F 16/285; G06F 9/451
(Continued)

(56) References Cited

U.S. PATENT DOCUMENTS 6,115,717 A * 9/2000 Mehrotra .......... G06F 17/30247
707/999.102
6,970,597 B1 * 11/2005 Olding .................. G06T 3/4015
348/273
(Continued)

OTHER PUBLICATIONS

Co-pending U.S. Appl. No. 14/230,143, entitled Classification of Software Based on User Interface Elements, by Langton et al., filed Mar. 31, 2014, 53 pages.

*Primary Examiner* — Greta L Robinson
(74) *Attorney, Agent, or Firm* — Harrity & Harrity, LLP

(57) ABSTRACT

A device may receive an instruction to classify software. The device may identify a group of one or more user interfaces associated with the software based on receiving the instruction to classify the software. The device may determine a group of one or more user interface signatures associated with the group of one or more user interfaces. A user interface signature may include information, associated with a user interface in the group of one or more user interfaces, that may be used to classify the software. The device may generate information that identifies a classification of the software based on the group of one or more user interface signatures and based on known signature information. The known signature information may include information that corresponds to a correct software classification. The device may output the information that identifies the classification of the software.

20 Claims, 13 Drawing Sheets

(51) Int. Cl.
  *G06F 16/35* (2019.01)
  *G06F 9/451* (2018.01)
  *G06F 16/182* (2019.01)

(58) Field of Classification Search
  USPC .......................................................... 707/737
  See application file for complete search history.

(56) References Cited

U.S. PATENT DOCUMENTS

| | | | | |
|---|---|---|---|---|
| 9,152,694 | B1* | 10/2015 | Padidar | G06F 17/30598 |
| 2002/0158898 | A1* | 10/2002 | Hsieh | G06F 17/30873 |
| | | | | 715/734 |
| 2008/0126938 | A1* | 5/2008 | Fleishman | G06F 9/4443 |
| | | | | 715/721 |
| 2008/0195958 | A1* | 8/2008 | Detiege | G06K 9/00449 |
| | | | | 715/765 |
| 2008/0307342 | A1* | 12/2008 | Furches | G06T 11/00 |
| | | | | 715/764 |
| 2010/0333030 | A1* | 12/2010 | Johns | G06F 3/048 |
| | | | | 715/834 |
| 2011/0271207 | A1* | 11/2011 | Jones | H04W 4/023 |
| | | | | 715/753 |
| 2012/0268480 | A1* | 10/2012 | Cooksey | G06F 9/451 |
| | | | | 345/619 |
| 2012/0278722 | A1* | 11/2012 | Raleigh | H04L 12/14 |
| | | | | 715/735 |
| 2012/0303666 | A1* | 11/2012 | Freed | G06F 17/30873 |
| | | | | 707/781 |
| 2013/0132854 | A1* | 5/2013 | Raleigh | G06F 3/0482 |
| | | | | 715/738 |

* cited by examiner

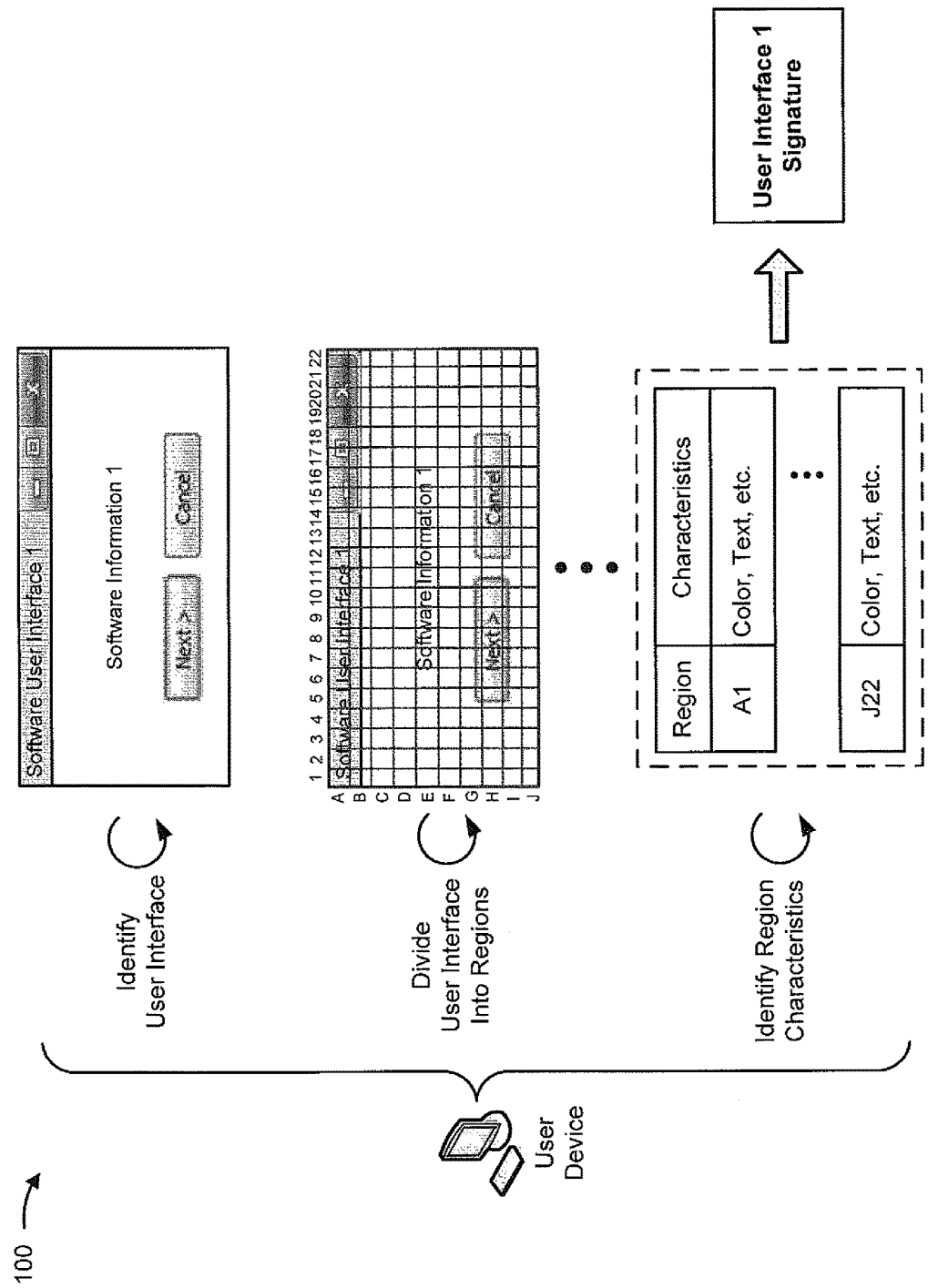

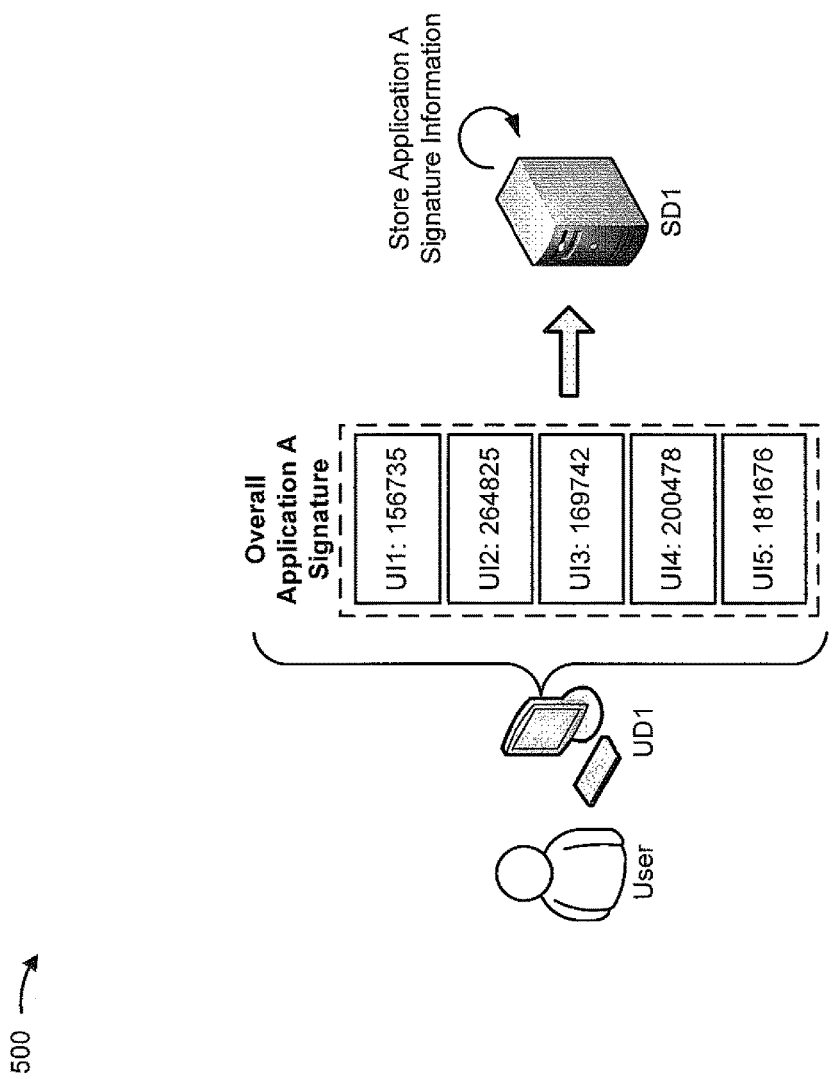

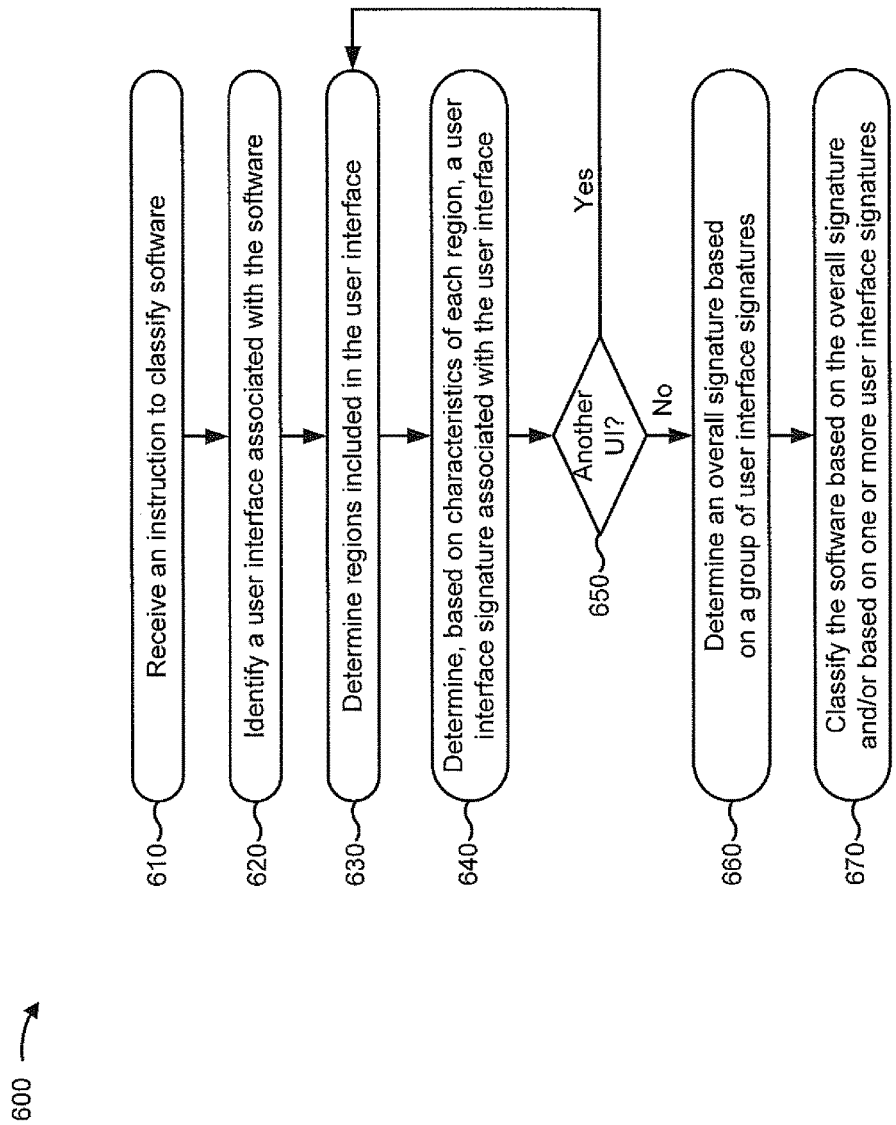

CLASSIFICATION OF SOFTWARE BASED ON USER INTERFACE ELEMENTS

RELATED APPLICATION

This application is a continuation of U.S. patent application Ser. No. 14/230/143 filed Mar. 31, 2014, which is incorporated herein by reference.

BACKGROUND

Software (e.g., a computer program) includes a set of instructions that, when executed by a device (e.g., a processor), causes the device to perform tasks for which the software is designed. In some cases, the software may be installed on a device to allow the software to be executed by the device. Additionally, some software is supplied in a form unsuitable for immediate execution and requires a software installation procedure to be performed.

SUMMARY

According to some possible implementations, a device may include one or more processors to: receive an instruction to classify software; identify a group of one or more user interfaces associated with the software based on receiving the instruction to classify the software; determine a group of one or more user interface signatures associated with the group of one or more user interfaces, where a user interface signature, in the group of one or more user interface signatures, may include information, associated with a user interface in the group of one or more user interfaces, that may be used to classify the software; generate information that identifies a classification of the software based on the group of one or more user interface signatures and based on known signature information, where the known signature information may include information that corresponds to a correct software classification; and output the information that identifies the classification of the software.

According to some possible implementations, a computer-readable medium may store one or more instructions that, when executed by one or more processors, cause the one or more processors to: identify a group of one or more user interfaces associated with a software installation of software; determine a group of one or more user interface signatures associated with the group of one or more user interfaces, where a user interface signature, in the group of one or more user interface signatures, may include information, associated with a user interface in the group of one or more user interfaces, that may be used to classify the software; generate information that identifies a classification of the software based on the group of one or more user interface signatures and based on known signature information, where the known signature information may include signature information that corresponds to a correct software classification; and provide the information that identifies the classification of the software.

According to some possible implementations, a method may include: identifying, by a device, a set of user interfaces associated with software; determining, by the device, a set of user interface signatures associated with the set of user interfaces, where a user interface signature, in the set of user interface signatures, may include information, associated with a user interface in the set of user interfaces, that may be used to classify the software; determining, by the device, information that identifies a classification of the software based on the set of user interface signatures and based on known signature information, where the known signature information may include signature information associated with a correct software classification; and outputting, by the device, the information that identifies the classification of the software.

BRIEF DESCRIPTION OF THE DRAWINGS

FIGS. 1A and 1B are diagrams of an overview of an example implementation described herein;

FIGS. 5A and 5B are diagrams of an example implementation relating to the example process shown in FIG. 4;

FIG. 6 is a flow chart of an example process for classifying software based on a group of user interfaces associated with the software.

DETAILED DESCRIPTION

The following detailed description of example implementations refers to the accompanying drawings. The same reference numbers in different drawings may identify the same or similar elements.

Classifying software (e.g., based on a name of the software, a version of the software, a type of the software, a family of the software, etc.) may be important for purposes of system administration, system security, identifying software incompatibilities (e.g., with an operating system), auditing software misuse, etc. In some cases, a user may wish for a user device, associated with the software, to automatically (e.g., without user intervention) classify the software. However, known techniques used to automatically classify software (e.g., a static analysis of an executable file associated with the software, a dynamic analysis of a behavior associated with the software, etc.) may be of limited capability. Implementations described herein may allow a user device to automatically classify software based on a group of user interfaces associated with the software.

Figure 1B:
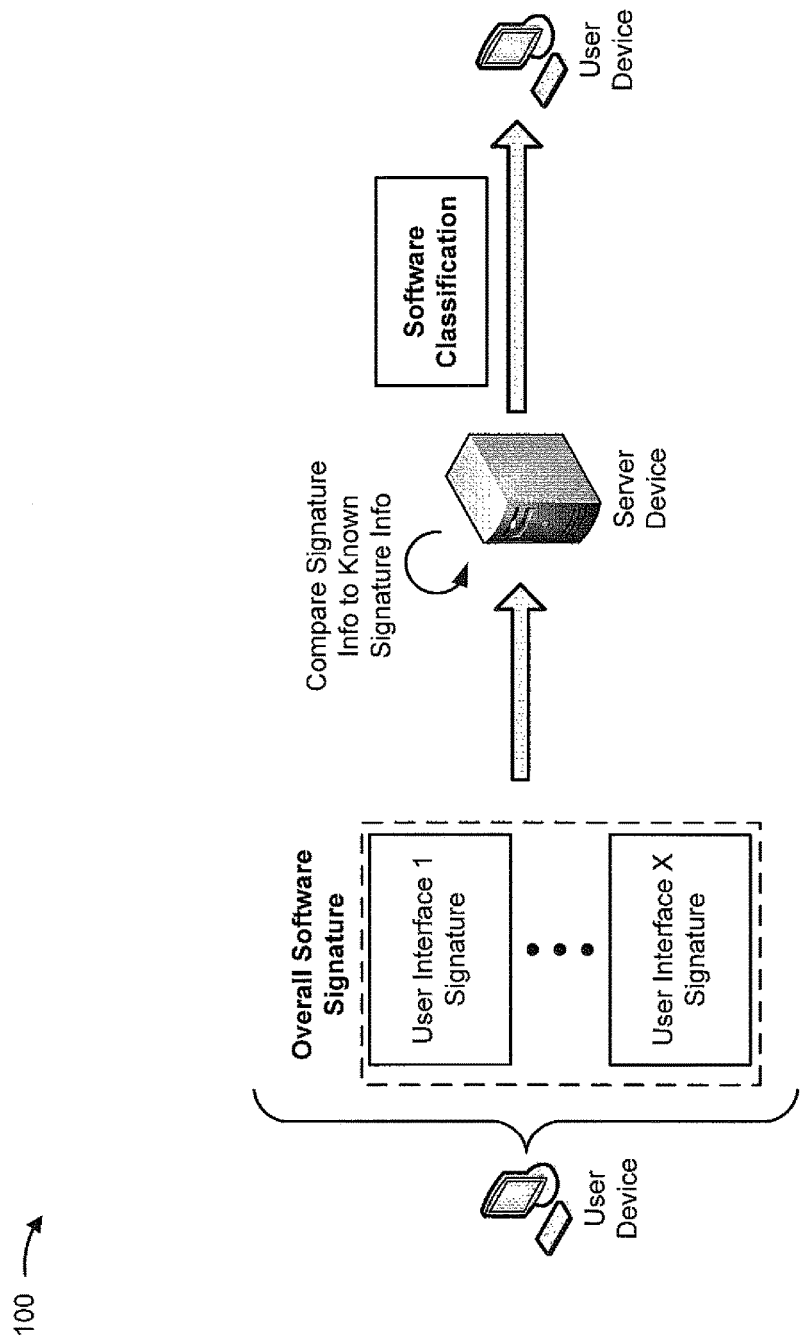

FIGS. 1A and 1B are diagrams of an overview of an example implementation 100 described herein. For the purposes of example implementation 100, assume that a user device has received an instruction to install software. Further, assume that the user device has initiated a software installation procedure, associated with installing the software, and that the user device is displaying (e.g., based on initiating the software installation procedure) a user interface, user interface 1, associated with installing the software.

As shown in FIG. 1A, the user device may identify (e.g., based on a screenshot captured by the user device) user interface 1. As further shown, the user device may determine (e.g., based on a grid system) a group of regions included in user interface 1. As further shown, the user device may identify (e.g., using computer vision, by analyzing user interface 1, etc.) characteristics (e.g., a color characteristic, a text characteristic, etc.) of each region of user interface 1. As further shown, the user device may determine, based on the characteristics associated with each region of user interface 1, a user interface 1 signature associated with user interface 1. A user interface signature may include information (e.g., a list of characteristics by region, a hash value associated with the characteristics of each region of user interface, such as a message-digest (MD) 4 hash value, an MD5 hash value, a secure hash algorithm (SHA) hash value, etc.), associated with the user interface, that may be used to classify the software.

Assume that the software installation procedure advances (e.g., based on an automated software installation process, based on a user interaction, etc.), and that the user device has determined (e.g., in the manner described above) a group of user interface signatures (e.g., user interface 1signature through user interface X signature) that correspond to a group of user interfaces (e.g., user interface 1through user interface X). Further, assume that user interface X is the last user interface associated with installing the software.

As shown in FIG. 1B, the user device may determine (e.g., based on the user interface 1 signature through the user interface X signature) an overall signature (e.g., a list of user interface signatures, a hash value, etc.) associated with the software. An overall signature may include information associated with a group of user interface signatures (e.g., a list of user interface signatures in the group of user interface signatures, a hash value associated with the group of user interface signatures, etc.) that may be used to classify software.

As shown, the user device may provide the group of user interface signatures and/or the overall signature to a server device associated with classifying the software. As shown, the server device may receive the group of user interface signatures and/or the overall signature, and may compare the group of user interface signatures and/or the overall user interface signature to known signature information stored by the server device. As shown, the server device may classify the software based on comparing the group of user interface signatures and/or the overall signature to the known signature information. As shown, the server device may provide information associated with the software classification to the user device. In this way, a user device may automatically classify software based on a group of user interfaces associated with the software.

Figure 2:
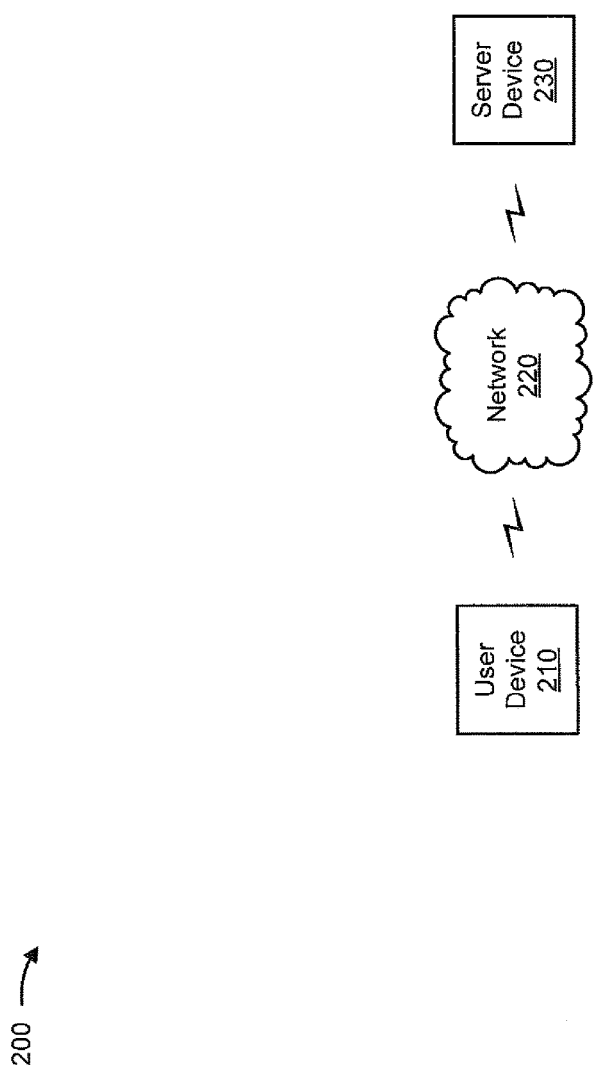
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a network 220, and a server device 230.

User device 210 may include one or more devices capable of classifying software based on a group of user interfaces associated with the software. For example, user device 210 may include a computing device, such as a laptop computer, a tablet computer, a handheld computer, a desktop computer, a mobile phone (e.g., a smart phone, a radiotelephone, etc.), a personal digital assistant, a gaming device, or a similar device. In some implementations, user device 210 may be capable of identifying the group of user interfaces associated with the software, determining a group of regions associated with each user interface, identifying (e.g., using computer vision, by analyzing the user interface, etc.) characteristics associated with each region of each user interface, and determining a user interface signature associated with each user interface. Additionally, or alternatively, user device 210 may be capable of determining an overall signature based on a group of user interface signatures associated with the group of user interfaces. Additionally, or alternatively, user device 210 may be capable of classifying the software based on the group of user interface signatures, the overall signature, and/or known signature information stored by server device 230.

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 220 may allow communication between devices, such as user device 210 and server device 230.

Server device 230 may include one or more server devices capable of receiving, providing, generating, storing, and/or processing information associated with a user interface signature and/or an overall signature associated with classifying software. For example, server device 230 may include a computing device, such as a server. In some implementations, server device 230 may be capable of comparing a user interface signature and/or an overall signature, associated with software, to a known user interface signature and/or a known overall signature (e.g., stored by server device 230), and classifying the software based on the comparison.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. For example, user device 210 and server device 230 may be implemented within a single device. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
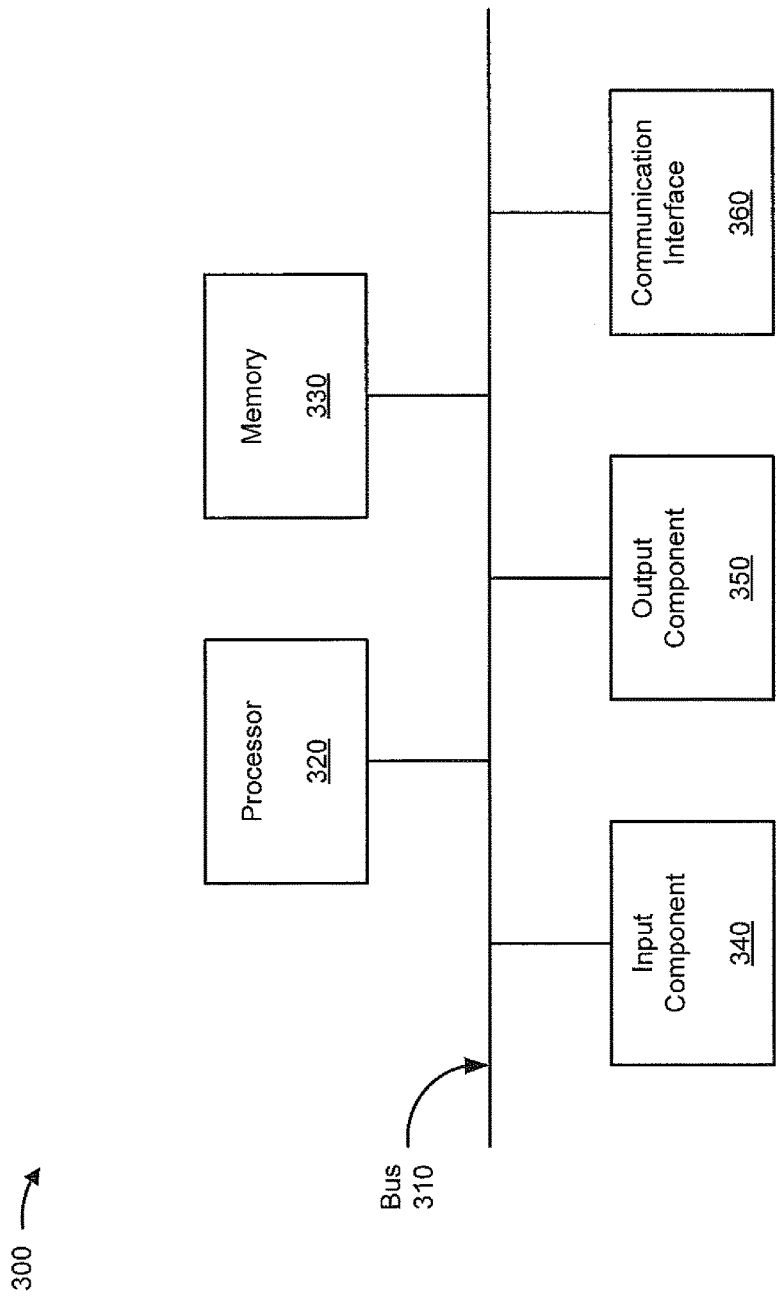
FIG. 3 is a diagram of example components of one or more devices of FIG. 2.

FIG. 3 is a diagram of example components of a device 300. Device 300 may correspond to user device 210 and/or server device 230. Additionally, or alternatively, each of user device 210 and/or server device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.).

Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
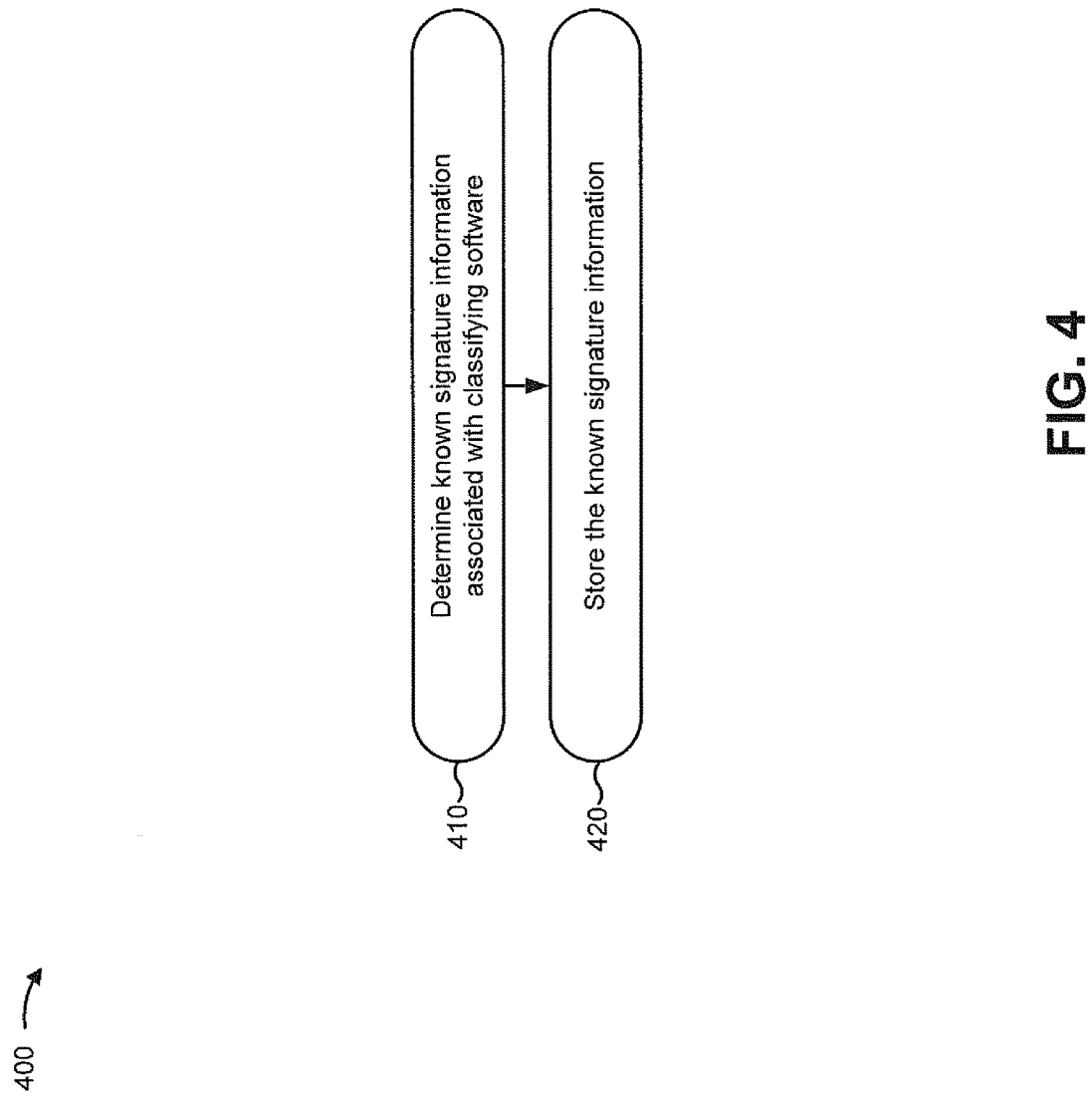
FIG. 4 is a flow chart of an example process for receiving and storing known signature information associated with classifying software.

FIG. 4 is a flow chart of an example process 400 for receiving and storing known signature information associated with classifying software. In some implementations, one or more process blocks of FIG. 4 may be performed by server device 230. In some implementations, one or more process blocks of FIG. 4 may be performed by another device or a group of devices separate from or including server device 230, such as user device 210.

As shown in FIG. 4, process 400 may include determining known signature information associated with classifying software (block 410). For example, server device 230 may determine known signature information associated with classifying software. In some implementations, server device 230 may determine the known signature information when server device 230 receives (e.g., from user device 210, based on user input, etc.) the known signature information.

Signature information may include information associated with one or more user interfaces (e.g., a dialog box, a progress bar, a flash screen, etc.) of the software, that may be used to classify the software. For example, the signature information may include a user interface signature associated with a user interface of the software (e.g., a user interface associated with installing the software, a user interface associated with executing the software, etc.), multiple user interfaces associated with the software, and/or an overall signature associated with the software.

A user interface signature may include information (e.g., a list of characteristics by region of the user interface, a hash value associated with the user interface, etc.), associated with a user interface of software, that may be used to classify the software. For example, a user interface may include a group of regions, and each region may include an average color (e.g., based on an 8-bit grayscale, based on a red-green-blue (RGB) color scale, etc.). In this example, the user interface signature may include a list of average colors, where each average color, included in the list of average colors, corresponds to a region of the user interface. As another example, the user interface signature may include a hash value determined (e.g., using a hash function) based on the list of average colors and their corresponding regions.

An overall signature may include information (e.g., a list of user interface signatures associated with a group of user interfaces of the software, a group of hash values associated with a group of user interfaces signatures, a single hash value associated with the group of user interfaces, etc.), associated with a group of user interfaces of the software, that may be used to classify the software. For example, a software installation procedure may include a group of user interfaces, and user device 210 may determine a group of user interface signatures (e.g., a group of hash values) that correspond to a group of user interfaces. In this example, the overall signature may include the group of hash values, an overall hash value determined based on the group of hash values, a list of characteristics (e.g., by region) of each user interface, or the like.

Known signature information may include signature information that corresponds to a known software classification (e.g., signature information that correctly classifies software). For example, the known signature information may include an overall signature (e.g., a hash value, etc.) that corresponds to a known software classification, such as a known identification associated with the software (e.g., a name of the software, a version of the software, etc.), a known type of the software (e.g., business software, communications software, video software, unapproved software, graphics software, etc.), a known software family associated with the software (e.g., a company associated with the software, an operating system associated with the software, etc.), or the like.

In some implementations, server device 230 may determine the known signature information based on input provided by a user of server device 230. For example, a user of server device 230 may provide (e.g., via an input mechanism of server device 230) the known signature information to server device 230.

Additionally, or alternatively, server device 230 may determine the known signature information based on information determined by user device 210. For example, user device 210 may classify software (e.g., as described below with regard to FIG. 6), may provide, to server device 230, known signature information associated with the software classification (e.g., assume that user device 210 has correctly classified the software), and server device 230 may receive the known signature information provided by user device 210. In this example, a user associated with server device 230 may verify the known signature information (e.g., to ensure that the software was correctly classified) when server device 230 receives the signature information. In this way, server device 230 may receive known signature information from many different user devices 210.

As further shown in FIG. 4, process 400 may include storing the known signature information (block 420). For example, server device 230 may store the known signature information. In some implementations, server device 230 may store the known signature information when server device 230 determines the known signature information (e.g., after server device 230 determines the known signature information). Additionally, or alternatively, server device 230 may store the known signature information when server device 230 receives information, indicating that server device 230 is to store the known signature information, from another device (e.g., user device 210). In some implementations, server device 230 may store (e.g., in a data structure, such as a table, a database, a linked list, etc.) the known signature information in a memory location (e.g., a RAM, a hard disk, etc.) of server device 230. Additionally, or alternatively, server device 230 may store the known signature information in a memory location associated with classifying software (e.g., such that server device 230 may retrieve the known signature information and use the known signature information to classify software at a later time).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
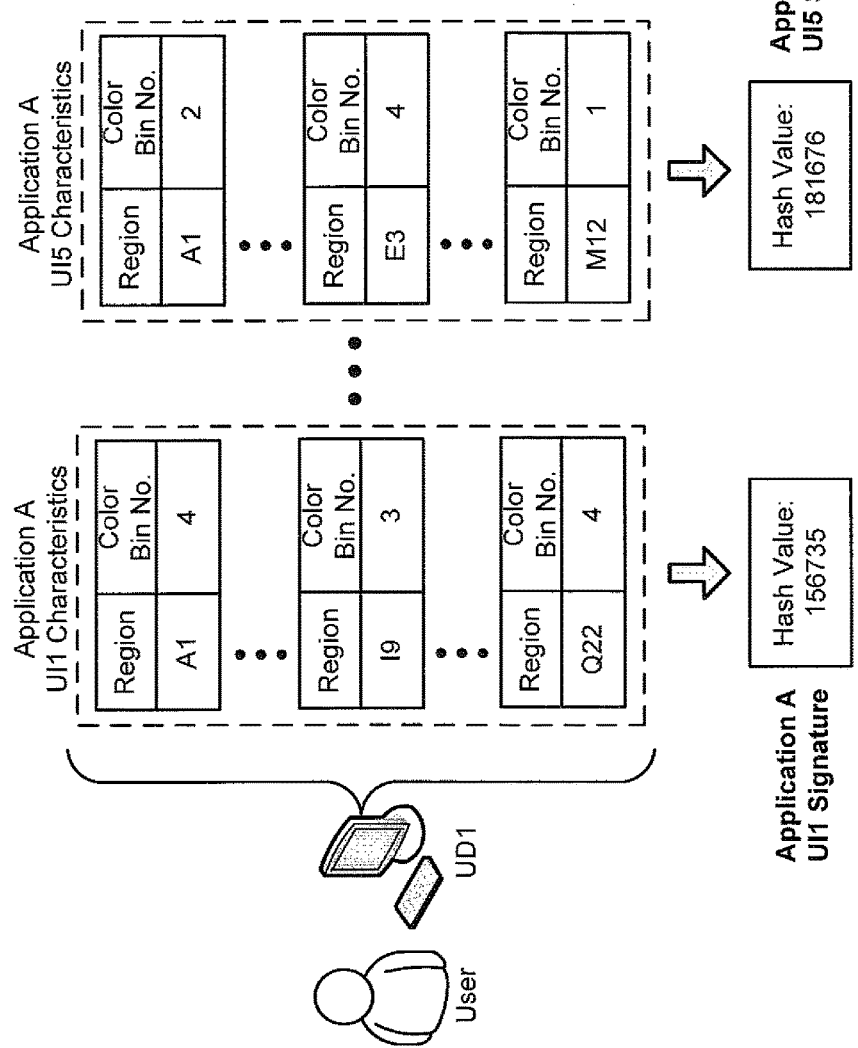

FIGS. 5A and 5B are diagrams of an example implementation 500 relating to example process 400 shown in FIG. 4. For the purposes of example implementation 500, assume that a user device (e.g., UD1) has received an instruction to install a software application (e.g., Application A), and that UD1 has received an instruction (e.g., based on user input) to determine signature information associated with a group of user interfaces included in an Application A software installation procedure associated with installing Application A. Further, assume that a user of UD1 has confirmed that the signature information (e.g., to be determined by UD1) will correspond to Application A (e.g., the user has confirmed that the signature information, to be determined by UD1, will be known signature information associated with Application A).

As shown in FIG. 5A, UD1 may determine (e.g., in the manner described below with regard to FIG. 6) a user interface signature associated with a first user interface (e.g., UI1) included in the Application A software installation procedure. As shown, UD1 may determine a hash value (e.g., 156735) that represents the Application A UI1 signature. As further shown, assume that the Application A software installation procedure advances (e.g., based on user input, etc.), and that UD1 continues to determine user interface signatures (e.g., hash values) associated with other user interfaces (e.g., UI2 through UI5) included in the Application A software installation procedure.

As shown in FIG. 5B, assume that UD1 has determined a hash value for each user interface include in the Application A software installation procedure. As shown, the UI1 signature (e.g., described above) may be a hash value of 156735, the UI2 signature may be a hash value of 264825, the UI3 signature may be a hash value of 169742, the UI4 signature may be a hash value of 200478, and the UI5 signature may be a hash value of 181676.

As further shown in FIG. 5B, UD1 may determine an overall signature associated with Application A. As shown, the overall signature may include information indicating that the overall signature is associated with Application A (e.g., information indicating that the signature information is known signature information), and may include a list of hash values associated with UI1 through UI5. As further shown, UD1 may provide the user interface signatures and the overall signature to a server device, SD1 (e.g., assume that SD1 is configured to store known signature information), and SD1 may store the known signature information associated with Application A.

As indicated above, FIGS. 5A and 5B are provided merely as an example. Other examples are possible and may differ from what was described with regard to FIGS. 5A and 5B.

FIG. 6 is a flow chart of an example process 600 for classifying software based on a group of user interfaces associated with the software. In some implementations, one or more process blocks of FIG. 6 may be performed by user device 210. In some implementations, one or more process blocks of FIG. 6 may be performed by another device or a group of devices separate from or including user device 210, such as server device 230.

As shown in FIG. 6, process 600 may include receiving an instruction to classify software (block 610). For example, user device 210 may receive an instruction to classify software associated with user device 210 (e.g., software being executed on user device 210, software being installed on user device 210, etc.).

In some implementations, user device 210 may receive the instruction to classify software based on a configuration of user device 210. For example, user device 210 may be configured to automatically (e.g., without user intervention) classify the software when user device 210 receives an instruction to install the software. Additionally, or alternatively, a user of user device 210 may provide input instructing user device 210 to classify the software (e.g., when the user initiates a software installation procedure and then the user initiates a software classifier program, when the user executes the software and then the user initiates the software classifier program, when the user initiates a software installation and user device 210 automatically initiates the software classifier program to classify the software, when the user executes the software and user device 210 automatically initiates the software classifier program, etc.). In some implementations, user device 210 may initiate a software installation procedure, associated with installing the software, when user device 210 receives the instruction (e.g., such that a first user interface, associated with the software installation, is displayed by user device 210). Additionally, or alternatively, user device 210 may execute the software when user device 210 receives the instruction (e.g., such that a first user interface, associated with executing the software, is displayed by user device 210).

As further shown in FIG. 6, process 600 may include identifying a user interface associated with the software (block 620). For example, user device 210 may identify a user interface associated with the software. In some implementations, user device 210 may identify the user interface when user device 210 receives the instruction to classify the software (e.g., after user device 210 receives the instruction to classify the software and initiates the software installation procedure, after user device 210 receives the instruction to classify the software and executes the software, etc.).

In some implementations, user device 210 may identify the user interface based on a screenshot image associated with the software. For example, user device 210 may capture a screenshot image reflecting information that is currently being displayed by a display screen of user device 210. In this example, user device 210 may capture the screenshot image after a first user interface, associated with the software, has appeared (e.g., after initiating the software installation procedure, after running the software, etc.,), and may compare the screenshot image to a base screenshot image, stored by user device 210, that includes a standard background (e.g., a screenshot image captured while no user interfaces were being displayed by user device 210). User device 210 may then identify the user interface based on comparing the screenshot image to the base screenshot image.

As further shown in FIG. 6, process 600 may include determining regions included in the user interface (block 630). For example, user device 210 may determine regions included in the user interface identified by user device 210. In some implementations, user device 210 may determine the regions when user device 210 identifies the user interface (e.g., after user device 210 identifies the user interface associated with installing the software, executing the software, etc.).

Regions of a user interface may include two or more portions of a user interface that, when combined, comprise the entire user interface. For example, user device 210 may determine the regions of the user interface by dividing the user interface into a group of regions (e.g., using a grid system). In some implementations, the regions may be of equal size (e.g., each region may include one pixel, each region may include one hundred pixels, etc.). Alternatively, the regions may be of unequal size.

In some implementations, the regions may be determined based on elements of the user interface. For example, user device 210 may detect (e.g., using computer vision) an area of the user interface that may be indicative of an edge of a rectangle, and user device 210 may determine the regions based on detecting the edge of the rectangle (e.g., such that the edge of the rectangle corresponds to an edge of one or more regions). In some implementations, the size, shape, and/or manner in which the regions are to be determined may be based on input, provided to user device 210, by a user of user device 210.

As further shown in FIG. 6, process 600 may include determining, based on characteristics of each region, a user interface signature associated with the user interface (block 640). For example, user device 210 may determine, based on characteristics of each region, a user interface signature associated with the user interface. In some implementations, user device 210 may determine the user interface signature when user device 210 determines the regions included in the user interface (e.g., after user device 210 determines the regions). Additionally, or alternatively, user device 210 may determine the user interface signature after user device 210 determines characteristics associated with the regions.

A characteristic of a region may include information associated with an attribute of the region. For example, the characteristic may include information associated with a color included in the region (e.g., a name of a color, a color identifier, an average color, a color number, etc.), information associated with a user interface element (e.g., a button, a check box, a radio button, etc.) included in the region, information associated with text included in the region, or another type of information associated with the region. In some implementations, user device 210 may determine the characteristic of the region using computer vision. Additionally, or alternatively, user device 210 may determine the characteristic of the region by analyzing the region in another manner. In some implementations, user device 210 may determine multiple characteristics associated with a single region.

In some implementations, user device 210 may determine characteristics of each region included in the user interface. For example, user device 210 may determine first characteristics that correspond to a first region of the user interface, may determine second characteristics that correspond to a second region of the user interface, etc., until user device 210 has determined characteristics of each region of the user interface.

In some implementations, user device 210 may determine a user interface signature, associated with the user interface, based on the characteristics associated with each region of the user interface. As described above, a user interface signature may include information, associated with a user interface of software, that may be used to classify the software, such as a list of characteristics by region, a hash value determined based on the characteristics of each region, etc.

In some implementations, user device 210 may determine the user interface signature using a technique that allows for a fuzzy match (e.g., an inexact match) of the user interface to be identified. For example, user device 210 may partition a color scale (e.g., an 8-bit grayscale associate with values ranging from 0 to 255) into a group of color bins (e.g., a first color bin that includes average colors ranging from 0 to 63, a second color bin that includes average colors ranging from 64 to 127, a third color bin that includes average colors ranging from 128 to 191, and a fourth color bin that includes average colors ranging from 192 to 255). In this example, user device 210 may convert the user interface to a grayscale image (e.g., an image including only shades of gray), determine an average color associated with each region (e.g., a value between 0 and 255), and user device 210 may identify a color bin that corresponds to the average color of each region. Here, the user interface signature may include a list of the regions and their corresponding color bin. Additionally, or alternatively, user device 210 may determine (e.g., using a hash function) a hash value based on the color bin associated with each region, and the user interface signature may include the hash value. By sorting the average colors into the color bins, the user interface signature may allow for a fuzzy match of the user interface to be identified (e.g., since the exact average colors of the regions are not included in the color signature).

Additionally, or alternatively, user device 210 may determine the user interface signature using a technique that allows for an exact match of the user interface to be identified (e.g., by determining an average color of each region, as described in the above example, without sorting the average colors of each region into color bins).

While the above examples are discussed with regard to determining the user interface signature based on average colors associated with the regions, other techniques are possible, such as determining a user interface signature based on a color histogram associated with each region of the user interface, etc. In some implementations, a technique used to determine the user interface signature may be based on a characteristic other than color, such as a text characteristic associated with each region of the user interface.

In some implementations, the technique used to determine the user interface signature may be modified. For example, a user of user device 210 may modify the technique (e.g., by indicating that a color scale is not to be partitioned into color bins) when the user wishes to allow for only an exact identification of software (e.g., when the user wishes to classify the software by identifying a name of the software). As an additional example, the user of user device 210 may modify the technique (e.g., by indicating that the color scale is to be partitioned into two bins, rather than four) when the user wishes to allow for a fuzzier (e.g., more inexact) match associated with classifying the software (e.g., when the use wishes to classify the software based on an operating system associated with the software).

As further shown in FIG. 6, process 600 may include determining whether there is another user interface associated with the software (block 650). For example, user device 210 may determine whether there is another user interface associated with the software. In some implementations, user device 210 may determine whether there is another user interface, associated with the software, when user device 210 determines the user interface signature associated with the user interface (e.g., after user device 210 determines the user interface signature associated with the user interface).

In some implementations, user device 210 may determine whether there is another user interface associated with a software installation procedure. For example, user device 210 may initiate a software installation procedure, associated with installing the software, that causes user device 210 to display a first user interface. In this example, the software installation procedure may advance (e.g., based on user input, based on an automated software installation program, etc.) past the first user interface (e.g., after user device 210 determines a user interface signature associated with the first user interface). In one example, the software installation procedure may advance such that user device 210 displays a second user interface, and user device 210 may determine (e.g., based on capturing a screenshot associated with the second user interface) that there is another user interface associated with installing the software. In another example, the software installation procedure may advance such that the software installation procedure is complete (e.g., the software is installed), and user device 210 may determine that there is not another user interface associated with installing the software.

Additionally, or alternatively, user device 210 may determine whether there is another user interface associated with executing the software. For example, user device 210 may execute the software that causes user device 210 to display a first user interface. In this example, a series of user interfaces associated with executing the software (e.g., a welcome screen, a login, etc.) may advance (e.g., based on user input, based on an automated software execution, etc.) past the first user interface (e.g., after user device 210 determines a user interface signature associated with the first user interface). In one example, the software execution may advance such that user device 210 displays a second user interface, and user device 210 may determine (e.g., based on capturing a screenshot associated with the second user interface) that there is another user interface associated with executing the software. In another example, the software execution may advance such that the software execution is complete (e.g., the software has stopped executing, etc.), and user device 210 may determine that there is not another user interface associated with executing the software.

As further shown in FIG. 6, if there is another user interface associated with the software (block 650—YES), then process 600 may return to block 630. For example, user device 210 may determine there is another user interface, associated with the software, and user device 210 may return to block 630 and determine another user interface signature, associated with the other user interface, in the manner described above. In this way, user device 210 may determine a group of user interface signatures that correspond to a group of user interfaces associated with the software.

As further shown in FIG. 6, if a there is not another user interface associated with the software (block 650—NO), then process 600 may include determining an overall signature based on a group of user interface signatures (block 660). For example, user device 210 may determine that there is not another user interface associated with the software, and user device 210 may determine an overall signature based on a group of one or more user interfaces associated with the software.

As described above, an overall signature may include information, associated with a group of user interfaces of the software, that may be used to classify the software. In some implementations, user device 210 may determine the overall signature based on the group of user interface signatures associated with the software. For example, user device 210 may determine the group of user interface signatures, and may determine the overall signature by creating a list of user interface signatures included in the group of user interface signatures. As another example, the overall signature may include a group of hash values (e.g., in the form of a list, a table, a string of characters, etc.) that correspond to the group of user interfaces signatures. Additionally, or alternatively, the overall signature may include a single hash value determined based on the group of user interface signatures and based on a hash function known to user device 210.

As further shown in FIG. 6, process 600 classifying the software based on the overall signature and/or based on one or more user interface signatures (block 670). For example, user device 210 may classify the software based on the overall signature and/or based on one or more user interface signatures. In some implementations, user device 210 may classify the software after user device 210 determines the overall signature associated with the software. Additionally, or alternatively, user device 210 may classify the software after user device 210 determines the group of user interface signatures associated with the software (e.g., when user device 210 is configured to classify the software based on the group of user interface signatures).

In some implementations, user device 210 may classify the software by identifying the software (e.g., a name of the software, a version of the software, etc.), by identifying a type of the software (e.g., business software, communications software, video software, unapproved software, graphics software, etc.), by identifying a software family associated with the software (e.g., a company associated with the software, an operating system associated with the software, etc.), or the like.

In some implementations, user device 210 may classify the software based on the overall signature associated with the software. For example, user device 210 may determine the overall signature (e.g., an overall hash value) associated with the software, and may compare (e.g., based on known signature information stored by server device 230) the overall signature to known signature information (e.g., a data structure of known overall hash values that correspond to known software classifications). In this example, if the overall signature matches a known overall signature, then user device 210 may classify the software based on a known classification associated with the known overall signature.

Additionally, or alternatively, user device 210 may classify the software based on the group of user interface signatures associated with the software. For example, user device 210 may determine the group of user interface signatures (e.g., a group of hash values) associated with the software, and may compare (e.g., based on known signature information stored by server device 230) the group of user interface signatures to known signature information (e.g., a data structure of known user interface hash values that correspond to known software classifications). In this example, if the group of user interface signatures matches a group of known user interface signatures, then user device 210 may classify the software based on a known classification associated with the group of known user interface signatures. In some implementations, user device 210 may be configured to classify the software based on a match threshold. For example, user device 210 may determine that a subset (e.g., four user interface signatures out of a group of five user interface signatures (80%)) of the group of user interface signatures matches the known signature information. In this example, if a match threshold (e.g., stored by user interface 210) is 90%, then user device 210 may determine that user device 210 is unable to classify the software (e.g., since the 80% match does not satisfy the 90% match threshold). Additionally, or alternatively, if a subset of the group of user interface signatures matches a group of known user interface signatures, then user device 210 may determine a partial classification associated with the software.

In some implementations, user device 210 may determine a partial classification of the software based on a partial match associated with a user interface signature. For example, a user interface signature, associated with a user interface of the software, may include a list of characteristics of regions included in the user interface, and user device 210 may determine that a portion of the list of characteristics matches a portion of a known user interface signature stored by server device 230. In this example, user device 210 may partially classify the software based on the portion of the list of characteristics that matches the portion of the known user interface signature stored by server device 230

In some implementations, user device 210 may classify the software based on information stored by server device 230. For example, user device 210 may determine the overall signature associated with the software, may provide the overall signature to server device 230, and server device 230 may compare the overall signature to a data structure of known overall signatures stored by server device 230. In this example, server device 230 may classify the software based on the comparison, and my provide information associated with the software classification to user device 210.

In some implementations, user device 210 may classify the software, and user device 210 may output information associated with the software classification for display by user device 210. Additionally, or alternatively, user device 210 may classify the software, and user device 210 may output information associated with the software classification for storage (e.g., by user device 210, by server device 230, etc.). Additionally, or alternatively, user device 210 may classify the software, and user device 210 may output information associated with the software classification to another device (e.g., server device 230).

In this way, user device 210 may classify the software based on the overall signature, based on the group of user interface signatures, and/or based on a particular user interface signature of the group of user interface signatures. The software classification may then be used for purposes of system administration, system security, identifying software incompatibilities, auditing software misuse, etc.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

FIGS. 7A-7E are diagrams of an example implementation 700 relating to example process 600 shown in FIG. 6. For the purposes of example implementation 700, assume that a user device, UD1, has received an instruction to install software, Application X. Further, assume that UD1 is configured to automatically (e.g., without user intervention) install Application X and to classify Application X (e.g., for purposes of identifying incompatibilities of the Application X on an operations system associated with UD1).

Figure 7A:
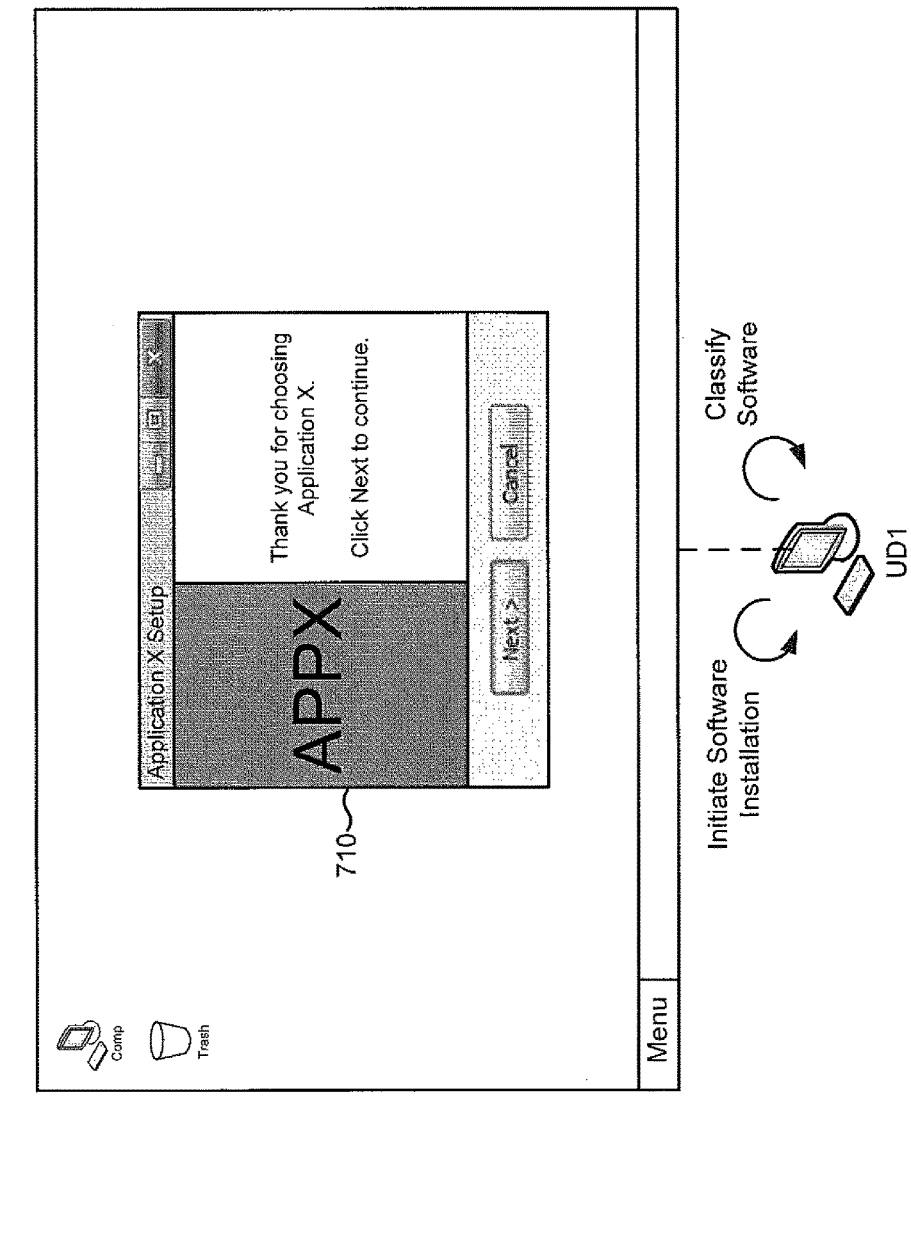
FIGS. 7A-7E are diagrams of an example implementation relating to the example process shown in FIG. 6.

As shown in FIG. 7A, UD1 may initiate a software installation procedure, associated with Application X, and may determine the UD1 is to classify the software (e.g., since UD1 is configured to classify software installed on UD1). As further shown, UD1 may display user interface 710 based on initiating the software installation procedure. UD1 may capture a first screenshot image (e.g., including user interface 710), may compare the first screenshot image to a base screenshot image (e.g., stored by UD1), and may identify user interface 710 based on the comparison.

Figure 7B:
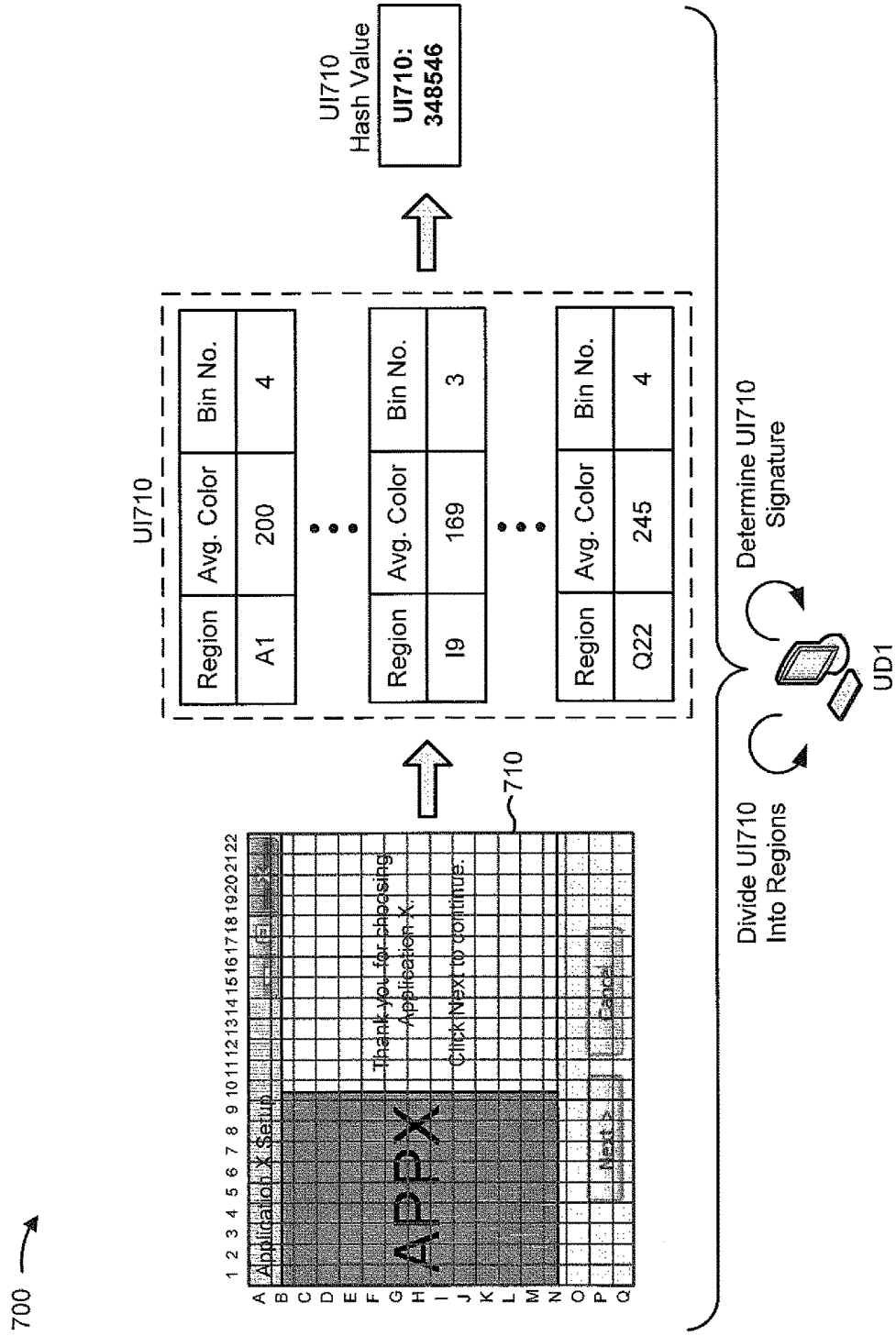

As shown in FIG. 7B, assume that UD1 has identified (e.g., based on the first screenshot image) user interface 710. As shown, UD1 may determine, based on a grid system, a group of regions (e.g., A1 through Q22) included in user interface 710. As further shown, UD1 may determine characteristics of each region. For the purposes of example implementation 700, assume that UD1 is configured to determine a characteristic that identifies an average color of each region based on four color bins (e.g., a first color bin that includes average colors ranging from 0 to 63, a second color bin that includes average colors ranging from 64 to 127, a third color bin that includes average colors ranging from 128 to 191, and a fourth color bin that includes average colors ranging from 192 to 255) associated with an 8-bit grayscale color scale (e.g., ranging from 0 to 255). As shown, UD1 may determine a characteristic that identifies an average color (e.g., 200) and a color bin number (e.g., 4) of region A1.

As shown, UD1 may similarly determine a characteristic that identifies an average color and a color bin number associated with each region of user interface 710 (e.g., including region 19 and region Q22, as shown). As further shown, UD1 may determine a first user interface signature, associated with user interface 710, by inputting the color bin number, associated with each region of user interface 710, into a hash function known to UD1. As shown, UD1 may determine that the first user interface signature, associated with user interface 710, is a hash value of 348546.

Figure 7C:
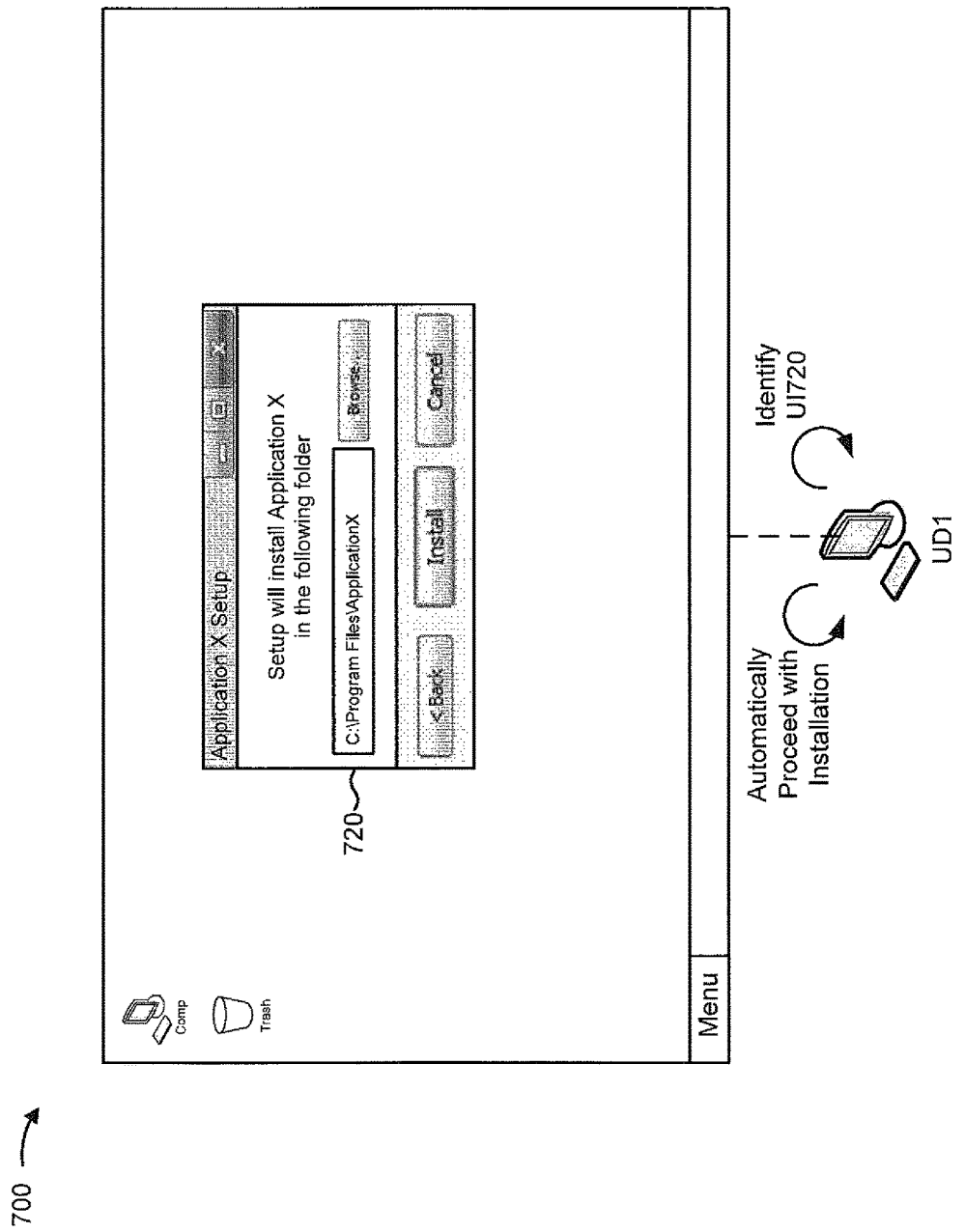

As shown in FIG. 7C, UD1 may proceed (e.g., using on an automated software installer program) with the software installation procedure associated with Application X. For the purposes of example implementation 700, assume that the software application procedure includes a second user interface, user interface 720, that immediately follows user interface 710. As shown, UD1 may identify user interface 720 (e.g., based on capturing a second screenshot image that includes user interface 720 and comparing the second screenshot image to the base screenshot image).

Figure 7D:
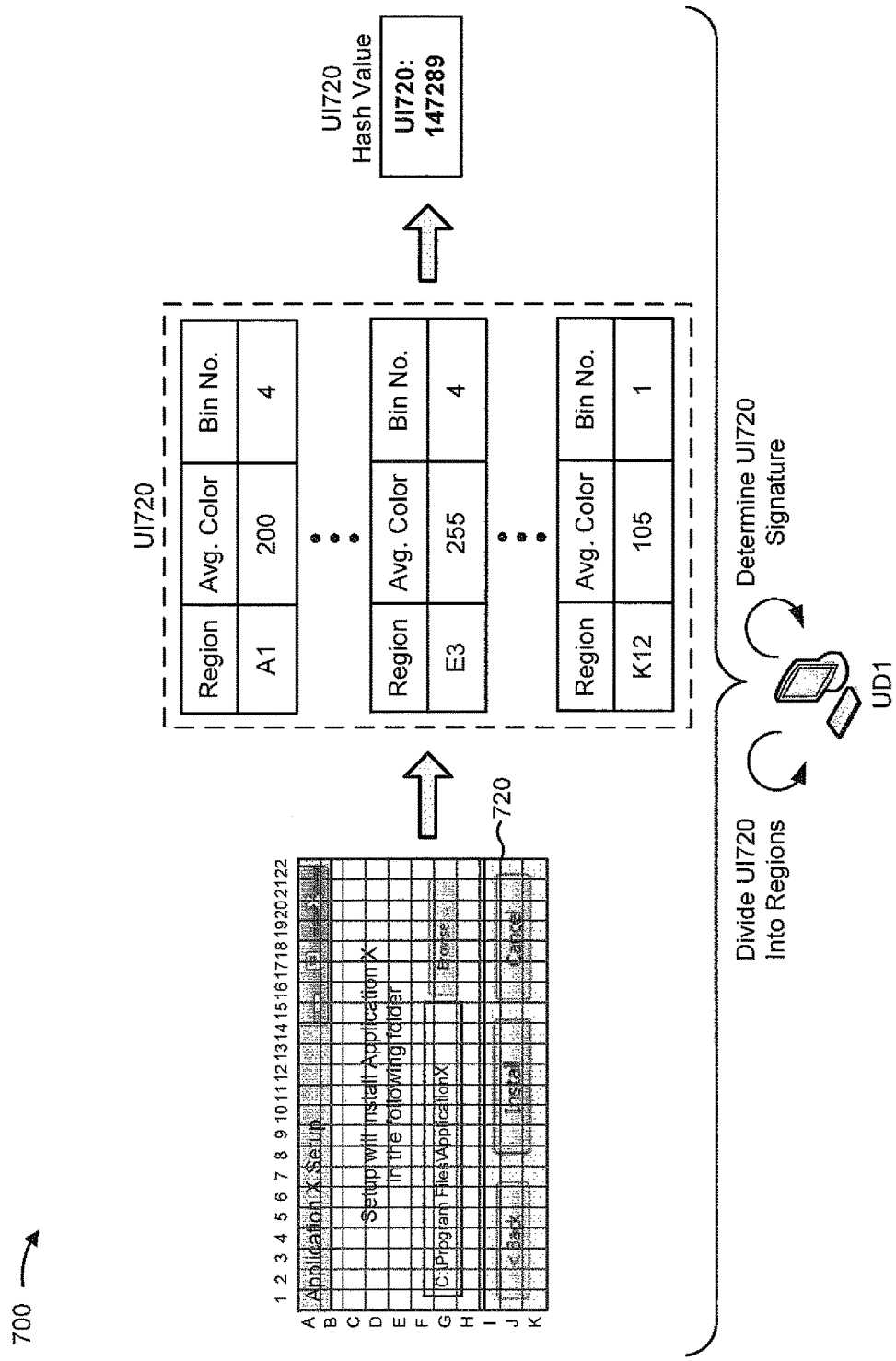

As shown in FIG. 7D, UD1 may determine, based on a grid system, a group of regions (e.g., A1 through K22) included in user interface 720. As further shown, UD1 may determine characteristics of each region. As shown UD1 may determine a characteristic that identifies an average color (e.g., 200) and a color bin number (e.g., 4) of region A1.

As shown, UD1 may similarly determine a characteristic that identifies an average color and a color bin number associated with each region of user interface 720 (e.g., including region E3 and region K12, as shown). As further shown, UD1 may determine a second user interface signature, associated with user interface 720, by inputting the color bin number, associated with each region of user interface 720, into the hash function known to UD1. As shown, UD1 may determine that the second user interface signature, associated with user interface 720, is a hash value of 147289.

Figure 7E:
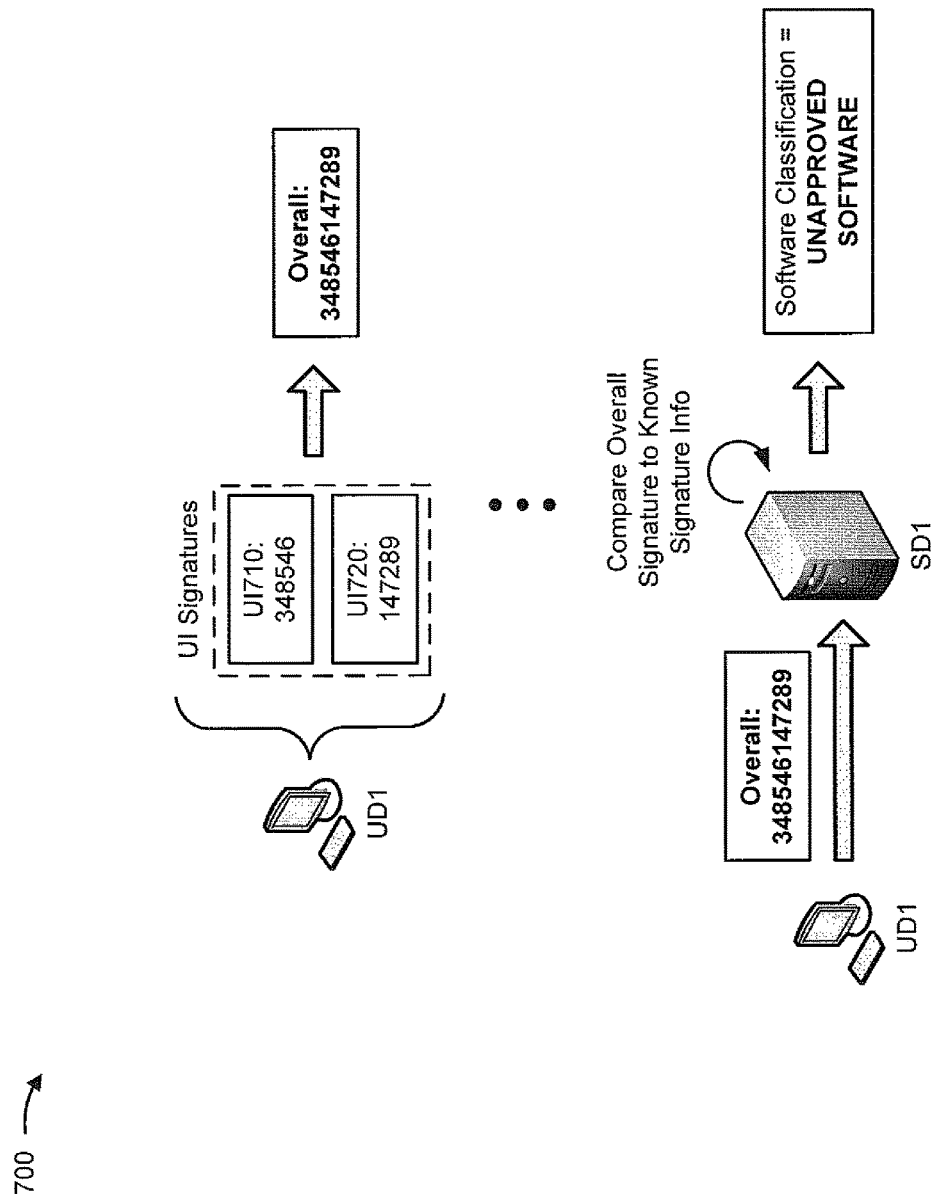

As shown in FIG. 7E, assume that UD1 determines that there are no other user interfaces associated with the software application procedure (e.g., Application X has been installed). As shown, UD1 may determine an overall signature associated with Application X based on the first user interface signature and the second user interface signature. As shown, assume that UD1 is configured to determine an overall signature by combining the first user interface signature and the second user interface signature into a single string of characters (e.g., such that the first user interface signature immediately precedes the second user interface signature). As shown, UD1 may determine that the overall signature is a string of characters that includes the two hash values, identified as 348546147289.

As further shown in FIG. 7E, UD1 may provide the overall signature to a server device, SD1, that stores known signature information. As shown, SD1 may compare the overall signature to known signature information. Assume that SD1 stores known signature information indicating that an overall signature of 348546147289 is to be classified as unapproved software. As shown, SD1 may classify Application X as unapproved software based on comparing the overall signature to the known signature information. As shown, SD1 may then provide information associated with classifying the software to UD1, and UD1 may present the information for display to a user of UD1.

As indicated above, FIGS. 7A-7E are provided merely as an example. Other examples are possible and may differ from what was described with regard to FIGS. 7A-7E. For example, while the methods have been described largely in the context of user interfaces associated with installing software, these methods may be equally applied to user interfaces associated with executing fully installed software, as described above.

Implementations described herein may allow a user device to automatically (e.g., without user intervention) classify software based on a group of user interfaces associated with the software.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   identifying, by one or more devices, a user interface of an application;
   determining, by the one or more devices, one or more regions included in the user interface by dividing the user interface into the one or more regions using a grid;
   identifying, by the one or more devices, one or more average colors associated with the one or more regions, an average color, of the one or more average colors, corresponding to a region of the one or more regions;
   determining, by the one or more devices, a first signature for the user interface based on the one or more average colors;
   determining, by the one or more devices and after determining the first signature for the user interface, that another user interface is associated with the application;
   determining, by the one or more devices and after determining that the other user interface is associated with the application, an overall signature for the application based on the first signature for the user interface and a second signature for the other user interface; and
   classifying, by the one or more devices, the application, by identifying a type of the application or a software family associated with the application, based on the overall signature for the application.

2. The method of claim 1, further comprising:
   determining a hash value based on the one or more average colors; and
   where determining the first signature for the user interface comprises:
   determining the first signature for the user interface based on the hash value.

3. The method of claim 1, where identifying the user interface comprises:
   identifying the user interface based on a screenshot image associated with the application.

4. The method of claim 1, where the first signature is determined further based on an attribute of the one or more regions.

5. The method of claim 4, where the attribute includes information associated with at least one of:
- a user interface element included in the one or more regions, or
- text included in the one or more regions.

6. The method of claim 1, where determining the first signature for the user interface comprises:
- sorting the one or more average colors into one or more color bins; and
- determining, based on the one or more color bins, the first signature for the user interface.

7. The method of claim 6,
- where the one or more average colors comprises two or more average colors, and
- where the one or more color bins comprises two or more color bins.

8. A computer-readable medium storing instructions, the instructions comprising:
- one or more instructions that, when executed by one or more processors, cause the one or more processors to:
  - identify a user interface of an application;
  - determine one or more regions included in the user interface by dividing the user interface into the one or more regions using a grid;
  - identify one or more average colors associated with the one or more regions,
    - an average color, of the one or more average colors, corresponding to a region of the one or more regions;
  - determine a first signature for the user interface based on the one or more average colors;
  - determine an overall signature for the application based on the first signature for the user interface and a second signature for another user interface; and
  - classify the application, by identifying a type of the application or a software family associated with the application, based on the overall signature for the application.

9. The computer-readable medium of claim 8, where the one or more instructions, when executed by the one or more processors, further cause the one or more processors to:
- determine a hash value based on the one or more average colors; and
- where the one or more instructions, that cause the one or more processors to determine the first signature for the user interface, are to:
  - determine the first signature for the user interface based on the hash value.

10. The computer-readable medium of claim 8, where the one or more instructions, that cause the one or more processors to identify the user interface, are to:
- identify the user interface based on a screenshot image associated with the application.

11. The computer-readable medium of claim 8, where the first signature f is determined further based on an attribute of the one or more regions.

12. The computer-readable medium of claim 11, where the attribute includes information associated with at least one of:
- a user interface element included in the one or more regions, or
- text included in the one or more regions.

13. The computer-readable medium of claim 11,
- where the one or more average colors are sorted into one or more color bins, and
- where the first signature for the user interface is based on the one or more color bins.

14. A device, comprising:
one or more memories; and
one or more processors, communicatively coupled to the one or more memories, to:
- identify a user interface of an application;
- determine one or more regions included in the user interface by dividing the user interface into the one or more regions using a grid;
- identify one or more average colors associated with the one or more regions,
  - an average color, of the one or more average colors, corresponding to a region of the one or more regions;
- determine a first signature for the user interface based on the one or more average colors;
- determine an overall signature for the application based on the first signature for the user interface and a second signature for another user interface; and
- classify the application, by identifying a type of the application or a software family associated with the application, based on the overall signature for the application.

15. The device of claim 14,
where the one or more processors are further to:
- determine a hash value based on the one or more average colors; and
where the one or more processors, when determining the first signature for the user interface, are to:
- determine the first signature for the user interface based on the hash value.

16. The device of claim 14, where the one or more processors, when identifying the user interface, are to:
- identify the user interface based on a screenshot image associated with the application.

17. The device of claim 14, where the first signature is determined further based on an attribute of the one or more regions.

18. The device of claim 17, where the attribute includes information associated with at least one of:
- a user interface element included in the one or more regions, or
- text included in the one or more regions.

19. The device of claim 14, where, when determining the first signature for the user interface, the one or more processors are to:
- identify a color bin that corresponds to the average color; and
- determine, based on the color bin, the first signature for the user interface.

20. The device of claim 14, where, when determining the first signature for the user interface, the one or more processors are to:
- identify a first color bin that corresponds to the average color;
- identify a second color bin that corresponds to another average color of the one or more average colors; and
- determine, based on the first color bin and the second color bin, the first signature for the user interface.

* * * * *